United States Patent [19]

Coffinberry

[11] Patent Number: 5,141,182
[45] Date of Patent: Aug. 25, 1992

[54] GAS TURBINE ENGINE FAN DUCT BASE PRESSURE DRAG REDUCTION

[75] Inventor: George A. Coffinberry, West Chester, Ohio

[73] Assignee: General Electric Company, Cincinnati, Ohio

[21] Appl. No.: 531,734

[22] Filed: Jun. 1, 1990

[51] Int. Cl.$^5$ .................................................. B64C 21/06
[52] U.S. Cl. .................................... 244/209; 244/130; 244/204
[58] Field of Search ............... 244/209, 204, 208, 130, 244/57, 134 B, 118.5; 60/226.1, 265, 266

[56] References Cited

U.S. PATENT DOCUMENTS

| | | | |
|---|---|---|---|
| 1,980,233 | 11/1934 | Stout | 244/209 |
| 2,041,794 | 5/1936 | Stalker | 244/208 |
| 2,078,854 | 4/1937 | Jones | 244/208 |
| 2,340,396 | 2/1944 | McDonnell, Jr. | 244/57 |
| 2,447,100 | 8/1948 | Stalker | 244/209 |
| 2,501,898 | 3/1950 | Haggerty | 244/118.5 |
| 2,509,890 | 5/1950 | Stalker | 244/209 |
| 2,517,524 | 8/1950 | Beck et al. | 244/209 |
| 2,551,697 | 5/1951 | Palmatier | 244/134 B |
| 2,659,552 | 11/1953 | Stalker | 244/209 |
| 2,737,874 | 3/1956 | Gallay et al. | 244/118.5 |
| 2,745,611 | 5/1956 | Sédille | 244/209 |
| 2,988,302 | 6/1961 | Smith | 244/209 |
| 3,024,624 | 3/1962 | Morley | 62/402 |
| 3,317,162 | 5/1967 | Grant | 244/209 |
| 3,428,242 | 2/1969 | Rannenberg | 230/116 |
| 3,878,677 | 4/1975 | Colvin | 60/39.14 |
| 3,951,360 | 4/1976 | Anxionnaz | 244/209 |
| 4,503,666 | 3/1985 | Christoff | 60/39.07 |
| 4,519,563 | 5/1985 | Tamura | 244/208 |
| 4,523,517 | 6/1985 | Cronin | 98/1.5 |
| 4,666,194 | 5/1987 | Kelber | 244/209 |
| 4,684,081 | 8/1987 | Cronin | 244/53 A |
| 4,749,150 | 6/1988 | Rose et al. | 244/209 |
| 4,783,026 | 11/1988 | Rumford et al. | 244/134 B |
| 4,993,663 | 2/1991 | Lahti et al. | 244/208 |

FOREIGN PATENT DOCUMENTS

| | | |
|---|---|---|
| 0065855 | 1/1982 | European Pat. Off. . |
| 3621783 | 7/1988 | Fed. Rep. of Germany . |
| 2554081 | 5/1985 | France . |
| 429465 | 7/1967 | Switzerland . |
| 585341 | 2/1947 | United Kingdom . |
| 743598 | 1/1956 | United Kingdom . |
| 774695 | 5/1957 | United Kingdom . |
| 846358 | 8/1960 | United Kingdom . |
| 2087540 | 5/1982 | United Kingdom . |
| 2127492 | 4/1984 | United Kingdom . |

OTHER PUBLICATIONS

Aerodynamics, Aeronautics, and Flight Mechanics (Chapter 4, pp. 162-163), 1979, Barnes W. McCormick.
Fluid-Dynamic Drag By: Signard F. Hoerner Published-1965 pp. 3-18, 3-19, 3-20 and 20-16.

*Primary Examiner*—Joseph F. Peters, Jr.
*Assistant Examiner*—Anne E. Bidwell
*Attorney, Agent, or Firm*—Jerome C. Squillaro

[57] ABSTRACT

An aircraft is provided with an aircraft base pressure drag reduction apparatus including apparatus for ducting boundary layer air on board an aircraft wherein the air produces ram air drag, apparatus for using the air for work, and apparatus for ducting the used boundary layer air to a low pressure area of an aircraft which otherwise produces base pressure drag on the aircraft to reduce the base pressure drag that the low pressure area would otherwise produce. In a more particular embodiment of the invention the low pressure area of the aircraft is in a fan duct of an aircraft gas turbine engine. In the preferred embodiment the low pressure area in a fan duct of an aircraft gas turbine engine is on the pylon fairing and the means for using the air for work includes at least one means for bleeding boundary layer air from the surface of the aircraft for reducing aircraft boundary layer induced drag.

2 Claims, 5 Drawing Sheets

GAS TURBINE ENGINE FAN DUCT BASE PRESSURE DRAG REDUCTION

BACKGROUND OF THE INVENTION

The invention relates to reducing base pressure drag of aircraft. More particularly the invention relates to reducing base pressure drag in low pressure regions of aircraft gas turbine engine fan ducts.

Means for reducing boundary layer drag of various aircraft parts such as wings, nacelles, and aircraft tail assemblies have been proposed in the past and in patent application Ser. No. 07/489,150 entitled "*AIRCRAFT ENGINE STARTER INTEGRATED BOUNDARY BLEED SYSTEM*", invented by Samuel Davison, filed Mar. 6, 1990 and assigned to the same assignee and in a patent application Ser. No. 071,531,718 entitled "*GAS TURBINE ENGINE POWERED AIRCRAFT ENVIRONMENTAL CONTROL SYSTEM AND BOUNDARY LAYER BLEED*", invented by the same inventor of this patent, filed on Jun. 1, 1990, and assigned to the same assignee, both incorporated herein by reference. One of the advantages of those inventions is the reduction in aerodynamic drag associated with engine nacelles, wings, pylons, tail sections and other aircraft outer surfaces due to boundary layers going turbulent. As air flows on to and over a surface such as an engine nacelle and aircraft wing it progressively builds up a low velocity boundary layer of increasing thickness. Within this boundary layer a portion of the velocity component of free stream total pressure is converted to increased static pressure. As the result of rise in static pressure, boundary layer thickness, and diffusion a point is reached where back pressure causes an otherwise laminar boundary layer to become turbulent.

In the turbulent region, a considerable amount of total pressure is converted to static temperature represented thermodynamically as an increase in entropy. By the time the boundary layer leaves the surface, or in the particular case of an aircraft gas turbine engine the end of the nacelle, an unrecoverable loss in total pressure has occurred. The large entropy rise associated with turbulence is at the expense of air momentum. Turbulence also gives rise to increased static pressure which may increase the intensity of rearward acting pressure force on the surface. Now, if the boundary layer thickness is kept small, separation and turbulence will not occur or will be delayed and drag can be substantially reduced.

One way to avoid increase in boundary thickness is to pump or bleed off boundary layer air through holes in the surface. This however incurs a ram air drag penalty due to loss of momentum of the boundary layer air taken on board the engine. Engine net thrust is equal to engine exhaust momentum minus inlet ram drag. Therefore the result is a problem of decreased engine efficiency or increased engine specific fuel consumption. Another problem addressed by the present invention relates to base pressure drag in the aircraft gas turbine engine fan duct. Certain low pressure regions of the fan duct such as in the aft tapered airfoil section of a pylon fairing produces base pressure drag. A description of low pressure base pressure drag may be found in the classical reference on the subject of drag, FLUID-DYNAMIC DRAG by Sighard Hoerner (particularly pages 3-18 to 3-20 and page 20-16), which is incorporated herein by reference. Thus, the present invention provides a means for ducting air brought on board an aircraft and compressed to a low pressure area of a gas turbine engine fan duct which otherwise produces base pressure drag in the duct.

It is, therefore, an object of the present invention to provide a more efficient aircraft gas turbine engine by using air that has been brought on board and thereby producing ram air drag, to reduce base pressure drag of the aircraft.

Another object of the present invention to provide a more efficient aircraft gas turbine engine by using compressed air that has been brought on board an aircraft gas turbine engine, thereby producing ram air drag, to reduce base pressure drag in the aircraft engine fan duct.

These objects and other features and advantages will become more readily apparent in the following description when taken in conjunction with the appended drawings.

SUMMARY OF THE INVENTION

Briefly, in accordance with one aspect of the present invention, an aircraft having a low pressure region which produces base pressure drag includes a means for using ram air drag producing air brought on board the aircraft and means for dumping the air into a low pressure region of the aircraft which otherwise produces base pressure drag. In a more particular embodiment of the present invention the low pressure region is located in a gas turbine engine fan duct and more particularly on the surface of the pylon fairing in the fan duct.

In the preferred embodiment the means for using ram air drag producing air is a boundary layer bleed means which bleeds boundary layer air from the nacelle and wings thereby compressing the bleed air brought on board. In a more specific embodiment the boundary layer air bleed means includes a means for bleeding boundary layer air from the tail assembly of the aircraft including tail engine nacelle and the horizontal and vertical stabilizers.

Another embodiment of the invention provides an auxiliary compressor drivingly linked to the starting air turbine, preferably on a common shaft, and having an inlet in fluid communication with a means for bleeding a portion of the boundary layer air from the outer surface of the nacelle.

Yet another embodiment includes an environmental control system ECS heat exchanger cooling fan driven by the turbine of the ECS turbocompressor wherein the ECS fan includes an inlet in fluid communication with a means for bleeding a portion of the boundary layer air from a forward portion of the outer surface of the aircraft wing.

DETAILED DESCRIPTION OF THE INVENTION

Figure 1:
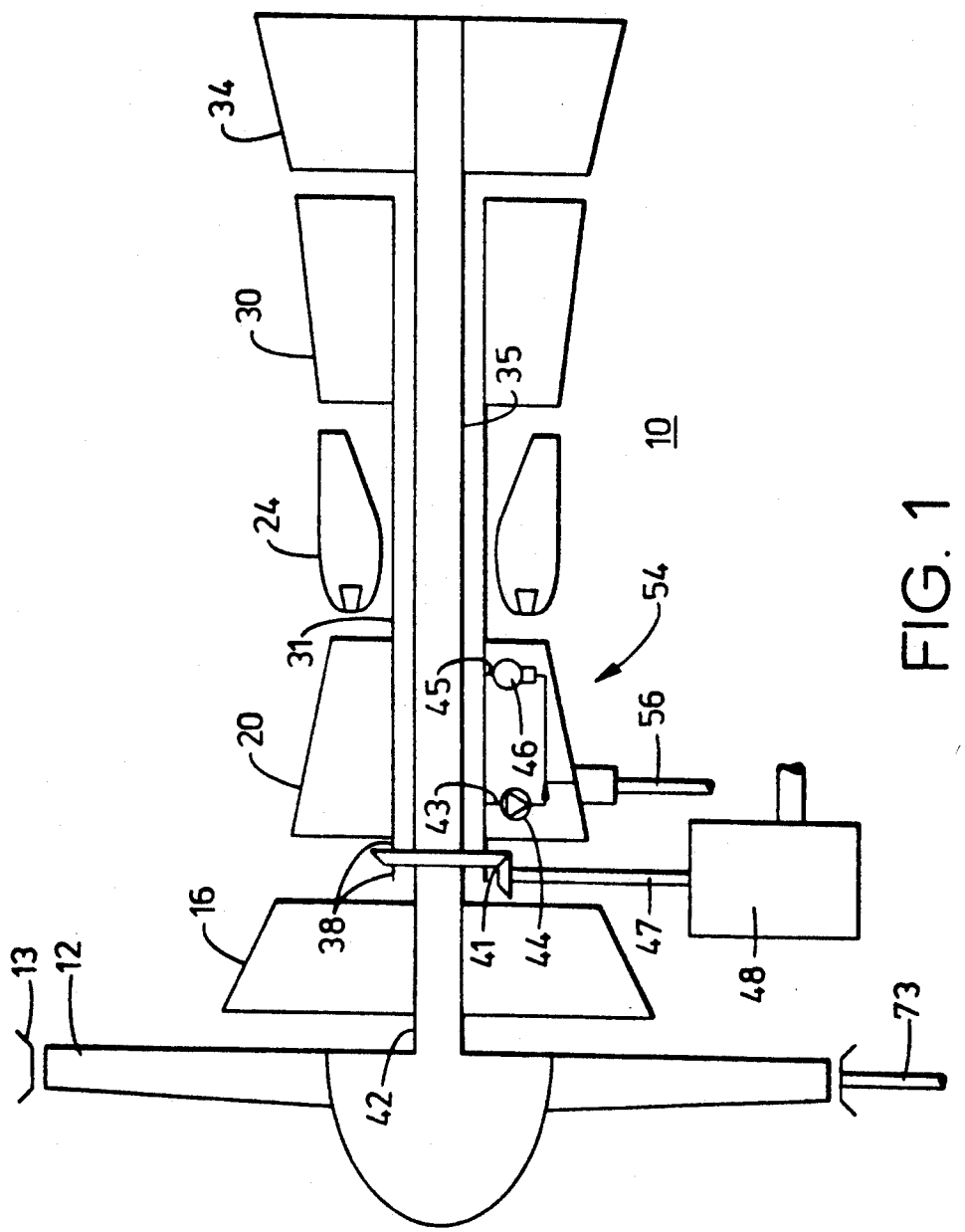
FIG. 1 is a schematic representation of an aircraft dual rotor gas turbine engine.

FIG. 1 illustrates a typical gas turbine engine 10 having in serial flow relationship a fan section 12, a low pressure compressor (LPC) 16, a high pressure compressor (HPC) 20, a combustion section 24, a high pressure turbine (HPT) 30, and a low pressure turbine (LPT) 34. A high pressure rotor 31 includes high pressure (HP) shaft 38 which connects, in driving relationship HPT 30 to HPC 20 and a low pressure rotor 35 includes a low pressure shaft 42 disposed within high pressure HP shaft 38 which drivingly connects LPT 34 to LPC 16 and fan 12. A power takeoff shaft 47 drivingly connects HP shaft 38 to starter gearbox 48 through a transfer gearbox depicted by the 45 degree bevel gears generally shown at their point of intersection 41 in FIG. 1.

A compressor bleed means 54, in FIG. 1, includes a mid compressor bleed line 43, preferably a seventh stage bleed for a General Electric CF6-80C2, and a compressor discharge bleed line 45 manifolded together and ducted out of HPC 20 by a compressor bleed duct 56. Disposed in mid compressor bleed line 43 is a check valve 44 which prevents higher pressure air from compressor discharge bleed line 45, which has a pressure actuated shutoff valve 46 disposed in it, flowing into a midstage of the compressor. During idle operation of the gas turbine engine 10 air from compressor discharge bleed line 45 is used and during the rest of the engine's operation compressor bleed air is supplied from mid compressor bleed line 43 to compressor bleed duct 56.

Figure 2:
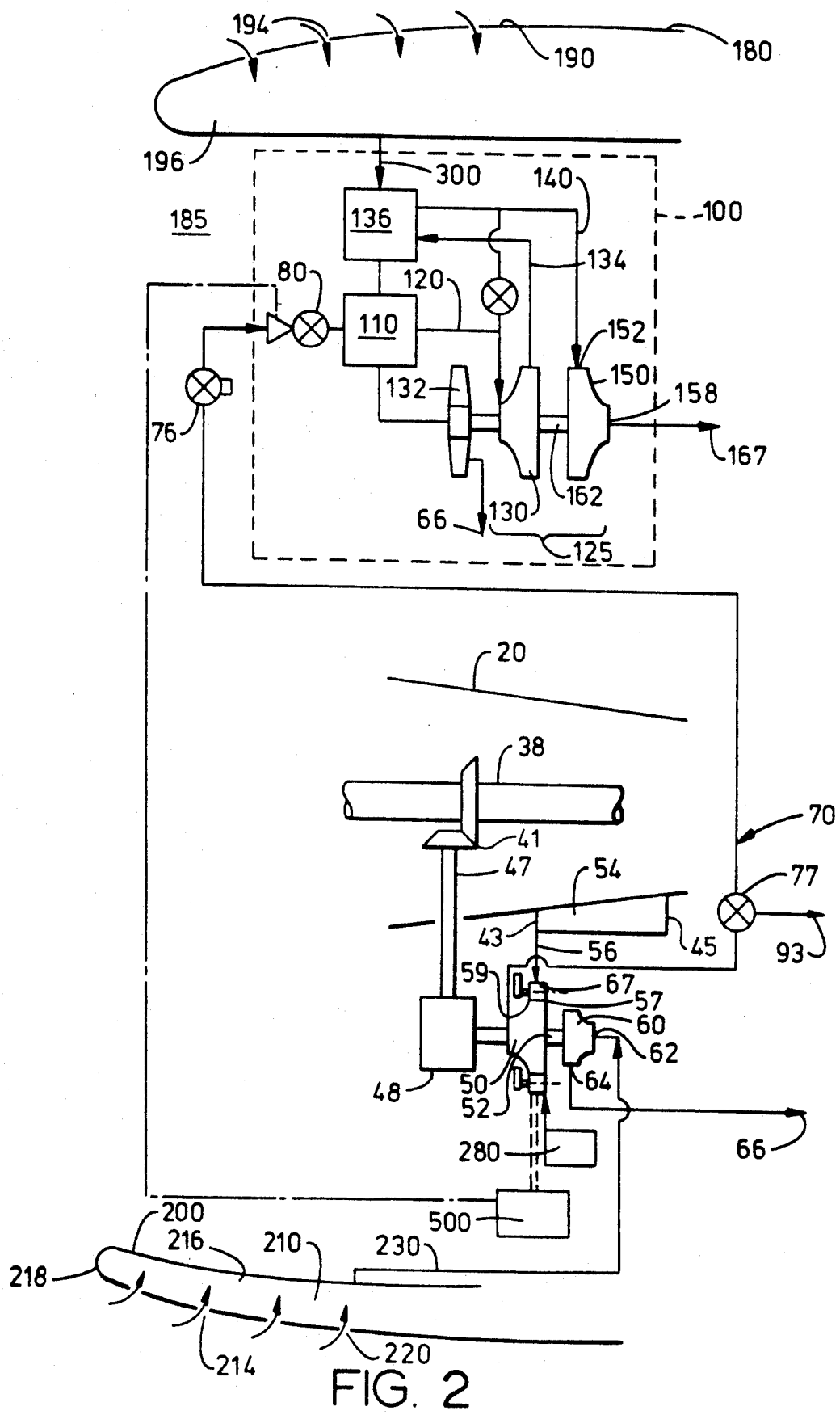
FIG. 2 is a schematic representation of the preferred embodiment of the preferred embodiment of the base pressure drag reduction means in the fan duct of a gas turbine engine having an aircraft environmental control system and aircraft boundary layer bleed.

FIG. 2 schematically depicts the preferred embodiment of the present invention for a wing mounted aircraft gas turbine engine 10. The preferred embodiment includes a power supply means for an aircraft ECS using compressed air supplied by a gas turbine engine compressor bleed means 54 from a midstage bleed line 43 or a compressor discharge bleed line 45 and an energy recovery means for returning the unrequired or unused amount of energy back to engine 10. The energy recovery means includes a starting air turbine 50 drivingly connected through a starter gearbox 48 and power takeoff shaft 47 to HP shaft 38. Starter gearbox 48 is preferably a planetary type gearbox so as to be able to efficiently receive and distribute power supplied to it by air turbine 50 and is conventionally integrated within the same casing or assembly (not shown) as air turbine 50.

Air turbine 50 is preferably a single stage radial inflow air turbine having an air turbine variable inlet 57, preferably of the variable vane type. Compressor bleed means 54 on engine 10 is connected in fluid supply communication by a compressor bleed duct 56 to air turbine inlet 57. A switchable starting air supply means 280, conventionally ducted to air turbine variable inlet 57 through a multi-function duct 70, provides sources of starting air including inflight sources such as crossbleed systems from other engines. Disposed in multi-function duct line 70 is a switchable starting air dump valve 77 having a overboard dump line 93.

Air turbine 50 includes a variable vane inlet 57 to control the pressure of compressed engine bleed air supplied to ECS flow control valve 80. The energy recovery means further provides for control of variable vane inlet 57 which is maintained by closed loop controller 500 which responds to a differential pressure signal provided by ECS flow control valve 80. Closed loop controller 500 closes and opens variable vane inlet 57, like the iris on a camera lens, in order to prevent less than a preselected pressure differential, about 1 psid or as system requirements dictate, across ECS flow control valve 80.

During engine ground start operation of the invention illustrated in FIGS. 1 and 2 air turbine 50 operates as a conventional air starting turbine receiving compressed starting air from starting air supply 280. Starting air is then dumped overboard by starting air dump valve 77 through line 93. The power created from air turbine 50 cranks HPT shaft 38 through starter gearbox 48 until engine 10 is capable of continuing operation without assist from air turbine 50. At this point of the engine's operation air turbine 50 continues to operate off of the compressor air supplied from compressor bleed means 54 unlike conventional starters which employ some sort of clutch mechanism after engine start to disconnect the starting turbine. Starting air valve 77 is then returned to a position which allows compressor bleed air to reach ECS pack 100.

The preferred embodiment, as shown in FIG. 2 is provided with an aircraft nacelle boundary layer bleed means having a nacelle boundary layer bleed means 216 including a perforated skin 214 surrounds a forward nacelle portion 220 having disposed within a nacelle plenum 210 for bleeding a portion of the boundary layer from the forward portion of the nacelle 220 which extends aft from about the nacelle leading edge 218. Nacelle plenum 210 is ducted to a nacelle boundary layer compressor 60 via nacelle bleed duct 230. Nacelle boundary layer compressor 60 is drivenly connected to air turbine 50 preferably on a common rotor or shaft 52 and maybe integrally mounted within a common casing with air turbine 50 so as to form a staring air and aircraft boundary layer bleed turbocompressor. In the preferred embodiment, boundary layer compressor 60 is a centrifugal compressor having a nacelle boundary layer bleed inlet 62 and outlet 64 which dumps to a low pressure region of the engine 66 such as in the fan bypass duct 13, schematically depicted in FIG. 1, where it may be used for thrust and reduction of localized fan duct base pressure drag.

Figure 4:
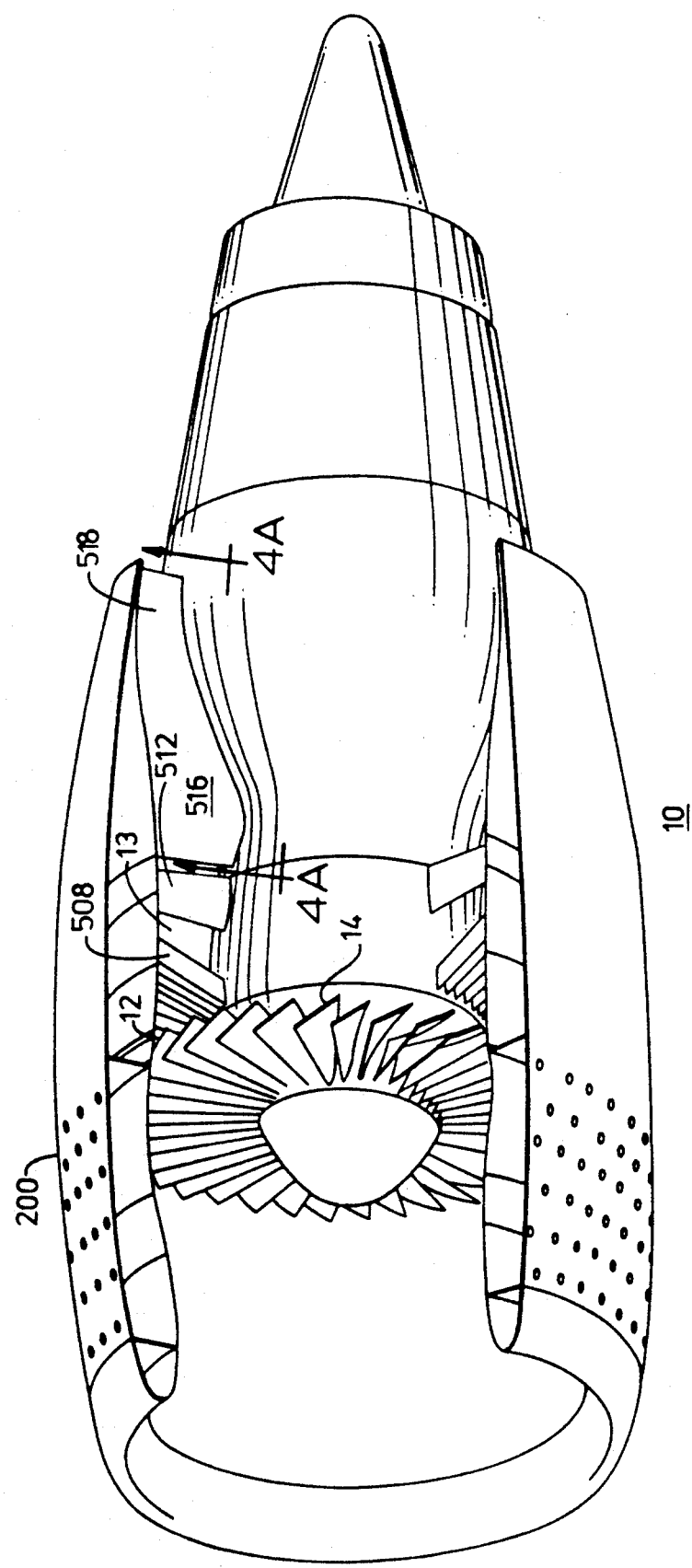
FIG. 4 is a cutaway perspective drawing of an aircraft engine fan duct.
Figure 4A:
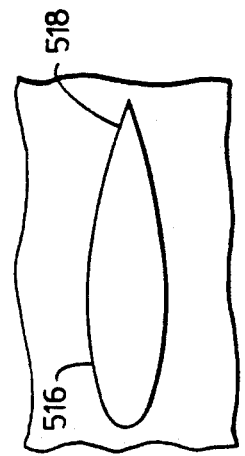
FIG. 4a is a cross section AA taken through the pylon fairing in FIG. 5 looking radially inward toward the engine.

FIG. 4 shows, in greater detail, a low pressure region 518 of fan duct 13 of the preferred embodiment. FIG. 4 shows engine 10 having a fan section 12 including fan blades 14 circumscribed by annular nacelle 200 which forms the radially outward wall of fan duct 13 aft of fan blades 14. Radially disposed within fan duct 13 in serial flow relationship are fan exit guide vanes 508, struts 512, and pylon fairings 516 respectively. Pylon fairing 516 conventionally has an airfoil shaped cross section as is more particularly shown in FIG. 4A which shows a cross section AA, looking radially inward, of the pylon fairing 516 shown in FIG. 4. The cross section more particularly points out the aerodynamic shape of pylon fairing 516 designed to reduce its drag thus giving it a thickened front end and a narrow thinned out aft end where the low pressure induced base pressure drag occurs. Low pressure region 518 lies in the thinned out aft section of airfoil shaped pylon fairing 516 which passes across fan duct 13.

The boundary layer air bled from the nacelles, wings, and tail assemblies, is ambient high pressure air having a substantial velocity relative to the aircraft thereby causing the aircraft to incur a significant ram air drag penalty when the air and its momentum is taken on board. The penalty is compensated for by the reduction in boundary layer drag. Using this compressed bleed air to reduce base pressure drag provides the advantage of further compensating for the ram air drag penalty. Dumping this used bleed air in a low pressure region of the fan duct such as in the thin section 518 of pylon fairing 516 reduces base pressure drag, and produces some extra thrust so as to further compensate for the ram air drag penalty. A description and of low pressure induced base pressure drag may be found in the classical reference on the subject of drag, FLUID-DYNAMIC DRAG by Sighard Hoerner (particularly pages 3-18 to 3-20 and page 20-16), which is incorporated herein by reference.

ECS pack 100, which has its various components depicted within the dotted rectangle in FIG. 2, is ducted to air turbine outlet 59 via a multi-function bleed duct 70 for receiving ECS bleed air. A multi-function bleed duct 70 conventionally also provides compressed starting air to the starting air turbine 50 and anti-icing air when needed. Operably disposed in multi-function bleed duct 70, in serial flow relationship, is a pressure regulating valve 76 used to limit the pressure within multi-function bleed duct 70 and a flow control valve 80 used to measure the amount and adjust the pressure of the bleed flow to the ECS pack 100.

Multi-function bleed duct 70 ducts ECS bleed air to primary heat exchanger 110 located in ECS pack 100 from where it is ducted to an ECS turbocompressor 125 via an ECS turbocompressor inlet duct 120 and used to power the ECS turbocompressor 125. Although in the preferred embodiment there should be no need for an engine compressor bleed air precooler, if air turbine 50 can be sized properly to provide, through expansion, all the cooling required of the engine compressor bleed air ducted through duct 70, there may be designs that require some precooling that may be provided by such a precooler as depicted in an alternate embodiment shown in FIG. 4 and explained in further detail further on herein.

ECS turbocompressor 125 includes an ECS compressor 130 which receives ECS bleed air from duct 120 and ducts it to a bleed air powered ECS turbine 150 via an intercooler duct 134 which first passes through a secondary heat exchanger 136 for the purpose of intercooling the ECS bleed air after it has been compressed by ECS compressor 130. The ECS bleed air is expanded through ECS turbine 150 to power the ECS turbine and cool the ECS bleed air and subsequently ducted to the aircraft cabin 167. ECS turbine 150 is mounted in driving relationship on a common turbocompressor shaft or rotor 162 with ECS compressor 130 and an ECS cooling fan 132.

Figure 5:
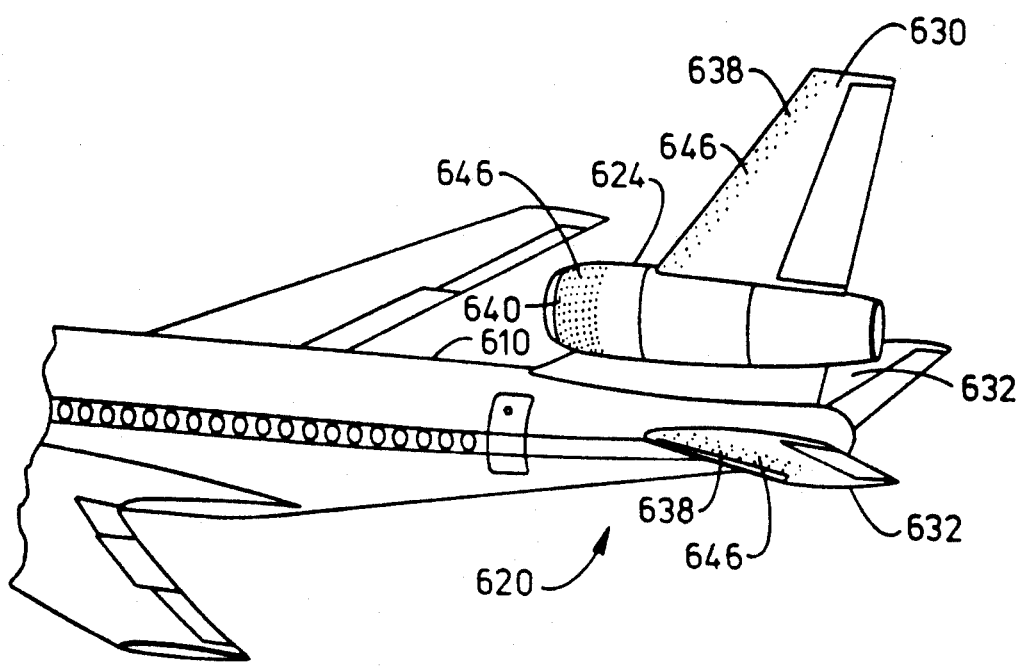
FIG. 5 is a perspective view of a tail assembly of an aircraft having a tail engine mounted in a tail engine nacelle.

The preferred embodiment further provides a wing boundary layer bleed means generally shown at 185 including a forward wing portion 190 of aircraft wing 180 wherein the forward portion is covered with a perforated wing skin 194 disposed about a wing plenum 196 which exhausts to ECS cooling duct 300 which passes through and provides the cooling air for secondary heat exchanger 136 and primary heat exchanger 110. The cooling wing boundary layer air and ECS cooling air is drawn through ECS cooling duct 300 by ECS cooling fan 132 and then dumped into dump line 66 which leads to low pressure region 518 of fan duct 13 of the preferred embodiment as shown in FIG. 5. During operation ECS cooling fan 132, driven by ECS turbine 150, draws the boundary layer off the wing as opposed to being unused in a conventional system wherein air scoops on the outside of the aircraft use ram air to cool the heat exchangers. Therefore the present invention has the added advantage of not requiring any additional rotating equipment such as a compressor to bleed a portion of the boundary off of the wing. This advantage significantly reduces any additional complexity or weight that might otherwise be added to the aircraft and its gas turbine engines.

The wing boundary layer air bled from the wings and brought on board the aircraft by the ECS pack 100 in an ECS bay has a substantial velocity relative to the aircraft thereby causing the aircraft to incur a significant ram air drag penalty when the air and its momentum is taken on board. The penalty is compensated for by the reduction in wing boundary layer drag. Using this wing boundary layer bleed air which has been compressed by ECS cooling fan 132 to reduce base pressure drag provides the advantage of further compensating for the ram air drag penalty.

As illustrated in FIG. 2, the preferred embodiment of the present invention, air turbine 50 continues to operate after engine start-up is complete and provides multiple functions and capabilities not found in conventional aircraft gas turbine engines. Starting air turbine 50 expands and therefore cools the compressor bleed air received from compressor bleed means 54 thereby reducing or eliminating the need for a bleed air precooler as found in conventional ECS systems if the system is properly sized and designed.

Figure 3:
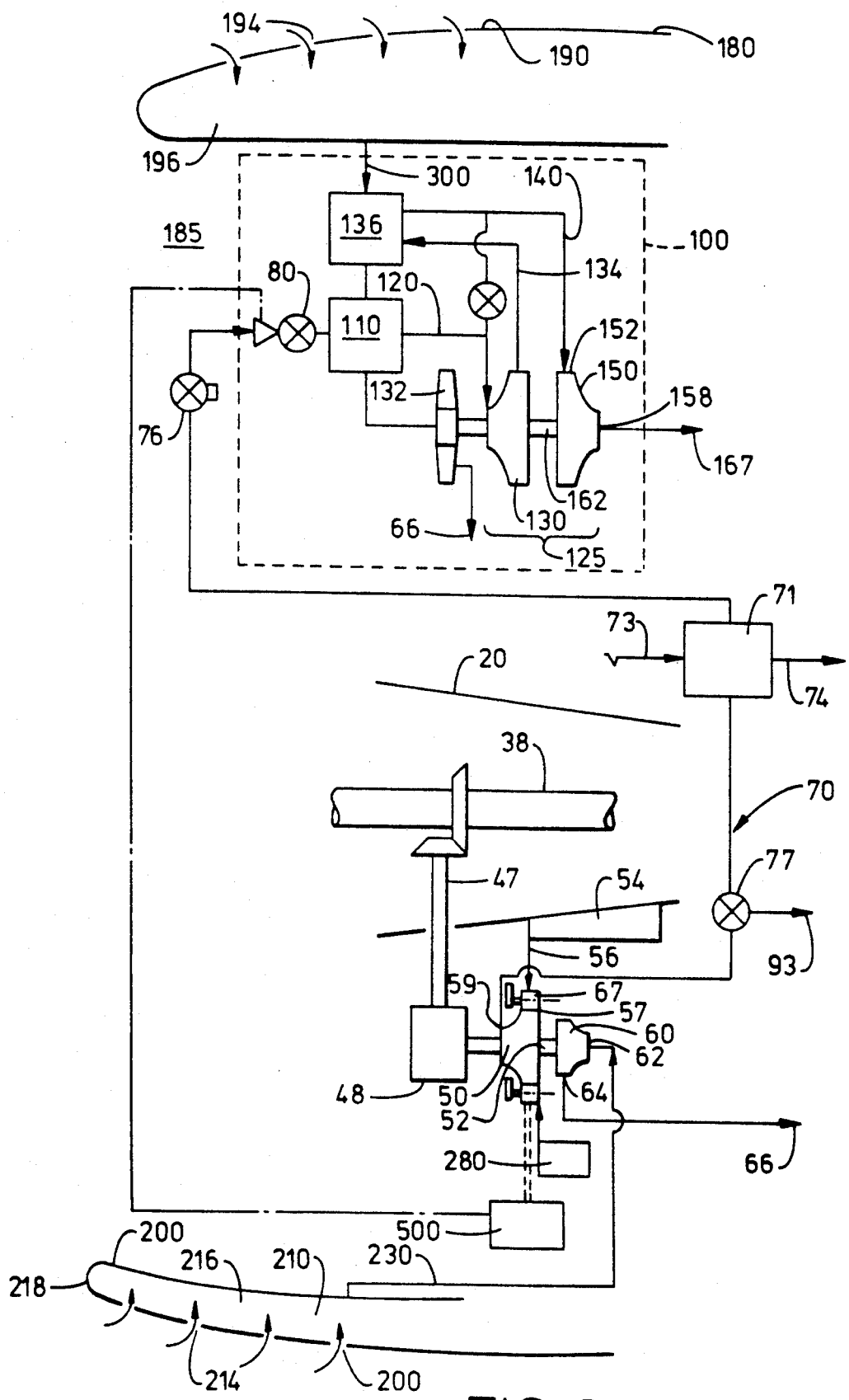
FIG. 3 is a schematic representation of the an alternate embodiment of the present invention as shown in FIG. 3 which includes an engine fan supplied precooler to precool the bleed air for the ECS.

However, an alternate embodiment, shown in FIG. 3, adds, to the preferred embodiment shown in FIG. 2, a fan powered compressor bleed air precooler 71 which requires little or no fan powered cooling air under most conditions but is included for those portions of the engine's flight envelope where it may be required or beneficial. Thus a substantial reduction in specific fuel consumption may be accomplished by reducing or eliminating the use of fan air for compressor bleed air precooling over a substantial portion of the aircraft gas turbine engine's operational envelope. Referring to FIG. 3, a fan bleed air duct 73, also shown in FIG. 1, ducts pressurized cooling air through compressor bleed air precooler 71, where it cools the compressor bleed air in compressor bleed air duct 70 being ducted to ECS pack 100, before being dumped through dump line 74.

An alternative embodiment shown in FIG. 5, contemplates bleeding boundary layer air from the airfoil structures of the tail assembly of an aircraft, such as the McDonnell Douglas DC-10 or MD-11, having a tail mounted engine. Such an embodiment would include the nacelle mounted engine and use the same ECS packs of FIG. 2 but without the wing boundary bleed system since the engine is not mounted near a wing. The embodiment includes the nacelle boundary bleed system 216 including air turbine 50 which drives nacelle boundary bleed compressor 60 as shown in FIG. 2. Referring to FIG. 6, the aircraft 610 includes a tail assembly 620 having a tail engine nacelle 624, a horizontal stabilizers 632 and vertical stabilizer 630. The tail engine nacelle 624 contains a gas turbine engine as in FIG. 2 but without powered wing bleed system. Nacelle 624 and stabilizers 630 and 632 each have respective perforated skin covered forward portions 638 of the stabilizers and 640 of the tail engine nacelle. The nacelle boundary layer bleed compressor 60 depicted in FIG. 2 is used to bleed air boundary layer air for the tail engine nacelle 624, vertical stabilizer 630, and horizontal stabilizers 632 through perforations 646 through an integrated series of flowpaths and plenums (not shown) beneath the perforated skins. It is contemplated that the plenums beneath the stabilizers would have flowpaths connected to a tail engine nacelle plenum and associated nacelle boundary layer bleed system similar to that shown in FIG. 2.

The present invention provides a distinct advantage for improving specific fuel consumption by returning otherwise unused energy to the engine and using the starting air turbine and ECS pack to reduce drag on the nacelles, wings, and tail assemblies by bleeding off boundary layer air. Sample calculations to determine the magnitude of the advantages that can be realized from the present invention were made based on the following presumptions. Typical Boeing 767-300 and McDonnell Douglas MD-11 aircraft having two and three General Electric CF6-80C2 engines respectively and passenger loads of 261 and 348 people respectively and for operating conditions at a 35,000 foot cruising altitude at a point where the engines are operating at thrust levels of 8400 and 8600 pounds respectively. The return of the unused energy in the compressor bleed flow represents a calculated reduction of 0.68% and 0.52% in specific fuel consumption for each respective engine and the nacelle boundary layer bleed means contributes approximately an additional reduction of 0.79% and 0.8% in specific fuel consumption per engine respectively. The wing boundary layer bleed means contributes a calculated reduction of 1.6% per aircraft or 0.8% per wing mounted engine in specific fuel consumption. The total projected reduction in specific fuel consumption is over 2% per aircraft, representing a significant fuel savings to the aircraft operators. The present invention has been described in an illustrative manner. It is to be understood that the terminology which has been used is intended to be in the nature of words of description rather than of limitation. It is important to note the multifunctionality ascribed to many elements of the invention such as ducts, valves, fans, and compressors which provide the advantages of decreased engine and aircraft specific fuel consumption and lower aircraft drag. The invention contemplates using the energy recovery system and the wing, the nacelle, and the combination nacelle and tail assembly boundary layer bleed systems individually as well as in combination in various embodiments of the present invention.

Obviously, many modifications and variations of the present invention are possible in light of the above teachings. It is, therefore, to be understood that within the scope of the appended claims, the present invention may be practiced otherwise than as specifically described.

What is claimed is:

1. An aircraft base pressure drag reduction means comprising:
a means for ducting boundary layer air on board an aircraft from an aircraft nacelle, a means for using the boundary layer air as working fluid in a compressor apparatus, and a means for ducting the used air from said compressor apparatus to a low pressure area on a pylon fairing in a fan duct of an aircraft gas turbine engine which otherwise produces base pressure drag on the aircraft.

2. An aircraft base pressure drag reduction means as claimed in claim 1 wherein said means for bleeding boundary layer air from the surface of the aircraft further comprises a tail assembly boundary layer bleed means.

* * * * *